US011125193B2

(12) United States Patent
Kitahara et al.

(10) Patent No.: US 11,125,193 B2
(45) Date of Patent: Sep. 21, 2021

(54) ABSOLUTE HUMIDITY SENSOR

(71) Applicant: DENSO CORPORATION, Kariya (JP)

(72) Inventors: Noboru Kitahara, Kariya (JP); Hajime Mashita, Kariya (JP); Takashi Ooga, Kariya (JP); Teruaki Kaifu, Kariya (JP)

(73) Assignee: DENSO CORPORATION, Kariya (JP)

( * ) Notice: Subject to any disclaimer, the term of this patent is extended or adjusted under 35 U.S.C. 154(b) by 267 days.

(21) Appl. No.: 16/512,797

(22) Filed: Jul. 16, 2019

(65) Prior Publication Data

US 2019/0338737 A1 Nov. 7, 2019

Related U.S. Application Data

(63) Continuation of application No. PCT/JP2018/000920, filed on Jan. 16, 2018.

(30) Foreign Application Priority Data

Feb. 8, 2017 (JP) ............................ JP2017-021503

(51) Int. Cl.
*F02M 35/10* (2006.01)
*G01K 13/02* (2021.01)

(52) U.S. Cl.
CPC .. *F02M 35/10393* (2013.01); *F02M 35/1038* (2013.01); *G01K 13/02* (2013.01);
(Continued)

(58) Field of Classification Search
None
See application file for complete search history.

(56) References Cited

U.S. PATENT DOCUMENTS 8,468,883 B2 * 6/2013 Sakuma ................ G01F 1/6965
73/204.26
9,869,573 B2 * 1/2018 Kawai ................... G01F 15/046
(Continued)

FOREIGN PATENT DOCUMENTS

JP 2015-90338 5/2015
JP 2016-31341 3/2016
(Continued)

OTHER PUBLICATIONS

U.S. Appl. No. 16/512,831 of Kitahara et al., filed on Jul. 16, 2019 (46 pages).

*Primary Examiner* — Freddie Kirkland, III
(74) *Attorney, Agent, or Firm* — Nixon & Vanderhye P.C.

(57) ABSTRACT

A temperature sensor and a relative humidity sensor are placed in an environment allowing air to flow and are displaced in an upstream-downstream direction of the airflow. An absolute humidity acquisition unit acquires absolute humidity of air from outputs from the temperature sensor and the relative humidity sensor. A delay adjustment unit delays an output from one of the temperature sensor and the relative humidity sensor placed upstream and to reconcile change-behaviors of outputs from the temperature sensor and the relative humidity sensor in response to a state change in air. The absolute humidity acquisition unit acquires the absolute humidity based on the output from the other of the temperature sensor and the relative humidity sensor placed downstream and an output acquired from the one sensor placed upstream and delayed in the delay adjustment unit.

7 Claims, 10 Drawing Sheets

21 TEMPERATURE SENSOR
23a RESPONSE DELAY PROCESSING UNIT
24 ABSOLUTE HUMIDITY CALCULATION UNIT
OUTPUT
RELATIVE HUMIDITY SENSOR 22

(52) U.S. Cl.
CPC ................ *F02D 2200/0414* (2013.01); *F02D 2200/0418* (2013.01)

(56) References Cited

U.S. PATENT DOCUMENTS

| | | | | |
|---|---|---|---|---|
| 9,958,305 | B2 * | 5/2018 | Nakano | G01F 1/6842 |
| 9,970,396 | B2 * | 5/2018 | Hoshika | G01M 15/042 |
| 10,344,697 | B2 * | 7/2019 | Ito | F02D 41/1479 |
| 10,429,223 | B2 * | 10/2019 | Ban | F02D 41/18 |
| 2003/0034443 | A1 * | 2/2003 | Kouznetsov | D06F 58/30<br>250/222.2 |
| 2013/0269419 | A1 | 10/2013 | Etherington et al. | |
| 2016/0202200 | A1 * | 7/2016 | Nakano | G01F 1/6845<br>73/23.31 |
| 2016/0273949 | A1 | 9/2016 | Kawai et al. | |
| 2017/0016415 | A1 * | 1/2017 | Hoshika | F02M 35/10393 |
| 2017/0059381 | A1 * | 3/2017 | Ban | G01F 1/696 |
| 2019/0338737 | A1 * | 11/2019 | Kitahara | F02M 35/10393 |

FOREIGN PATENT DOCUMENTS

| | | |
|---|---|---|
| JP | 2016-109625 | 6/2016 |
| WO | 2018/147004 | 8/2018 |

* cited by examiner

FIG. 15

| | TEMPERATURE | | FLOW RATE | |
|---|---|---|---|---|
| | LOW | HIGH | LOW | HIGH |
| TEMPERATURE SENSOR | – | – | SLOW | FAST |
| HUMIDITY SENSOR | SLOW | FAST | SLOW | FAST |

ABSOLUTE HUMIDITY SENSOR

CROSS REFERENCE TO RELATED APPLICATION

The present application is a continuation application of International Patent Application No. PCT/JP2018/000920 filed on Jan. 16, 2018, which designated the U.S. and claims the benefit of priority from Japanese Patent Application No. 2017-21503 filed on Feb. 8, 2017. The entire disclosures of all of the above applications are incorporated herein by reference.

TECHNICAL FIELD

The present disclosure relates to an absolute humidity sensor configured to detect an absolute humidity in air.

BACKGROUND

Conventionally, a technique has been known to detect an absolute humidity in air based on relative humidity and temperature.

SUMMARY OF INVENTION

According to one aspect of the present disclosure, an absolute humidity sensor is placed in an environment allowing air to flow. The absolute humidity sensor includes a temperature sensor and a relative humidity sensor placed at different positions and configured to acquire an absolute humidity based on signals from those sensors.

BRIEF DESCRIPTION OF THE DRAWINGS

The above and other objects, features and advantages of the present disclosure will become more apparent from the following detailed description made with reference to the accompanying drawings. In the drawings:

FIG. 15 is a table illustrating the responsiveness of a temperature sensor and a relative humidity sensor according to the fourth embodiment in terms of the temperature and the flow rate.

DETAILED DESCRIPTION

Figure 1:
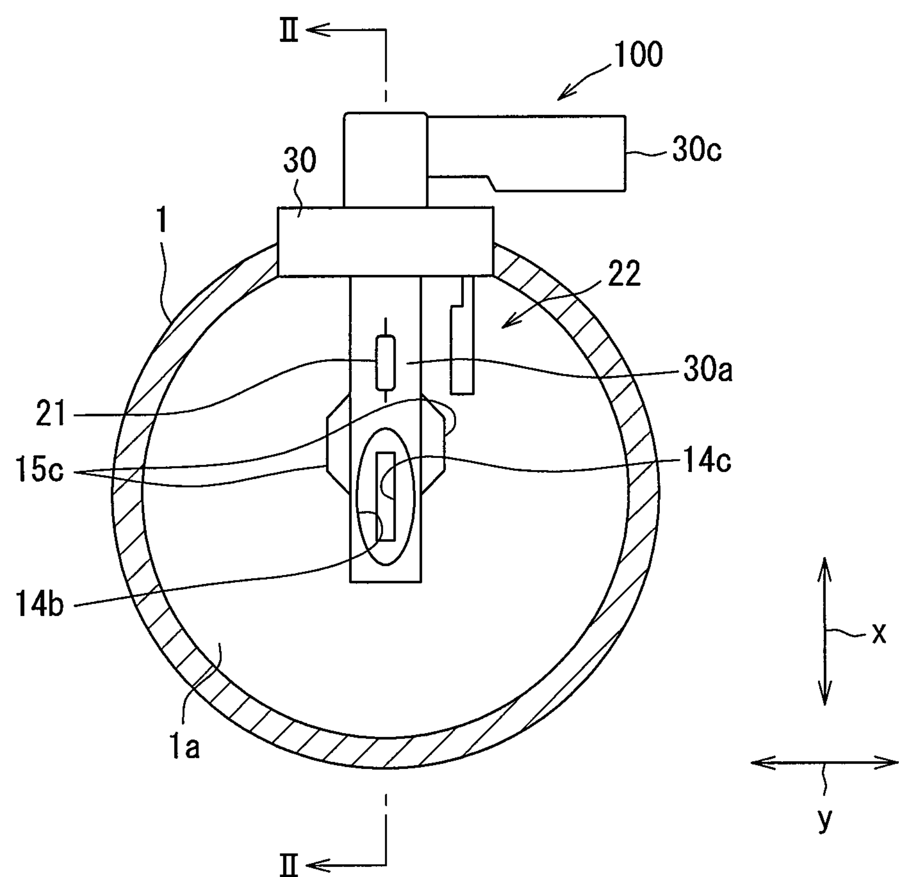
FIG. 1 is a front view illustrating a state of mounting an airflow meter according to a first embodiment.

To begin with, technical issues will be discussed as follows.

A physical quantity detection apparatus is employed to detect a physical quantity such as a humidity. For example, an absolute humidity sensor is configured to detect an absolute humidity in air. An absolute humidity sensor having a conceivable configuration calculates an absolute humidity based on relative humidity information and temperature information output from a humidity sensor and a temperature sensor.

For example, it is assumable to place a humidity sensor, which is to output the relative humidity information, and a temperature sensor, which is to output temperature information, upstream and downstream in an environment where air as a detection target flows. In this case, a difference could arise in change-behaviors of an output from the humidity sensor and an output from the temperature sensor in response to a change in a state of air.

In the conceivable configuration, the humidity sensor and the temperature sensor are placed upstream and downstream at different positions in different states. That is, the humidity sensor and the temperature sensor cannot detect air in the same state when the change arises in the state of air. Thus, step-like difference could occur in the sensor signals time-wise. Consequently, the conceivable configuration would cause a spike-like error in the absolute humidity calculated based on the temperature information and the humidity information due to the difference in the state of air.

According to an aspect of the present disclosure, an absolute humidity sensor comprises a temperature sensor placed in an environment allowing air to flow and configured to output a temperature signal as a sensor signal corresponding to temperature of air. The absolute humidity sensor further comprises a relative humidity sensor placed in the environment and configured to output a relative humidity signal as a sensor signal corresponding to relative humidity of air. The absolute humidity sensor further comprises an absolute humidity acquisition unit configured to acquire absolute humidity of air from the temperature signal and the relative humidity signal. The temperature sensor and the relative humidity sensor are placed at positions displaced in an upstream-downstream direction of a flow of air in the environment. The absolute humidity sensor further comprises a delay adjustment unit configured to delay an output from an upstream sensor corresponding to one of the temperature sensor and the relative humidity sensor placed upstream and to reconcile change-behaviors of an output from the temperature sensor and an output from the relative humidity sensor in response to a state change in air. The absolute humidity acquisition unit is configured to acquire the absolute humidity based on a sensor signal from a downstream sensor placed downstream and a sensor signal that is acquired from the upstream sensor and is delayed in the delay adjustment unit.

The present aspect acquires the absolute humidity in air from the temperature signal and the relative humidity signal output from the temperature sensor and the relative humidity sensor, respectively, placed at positions displaced in the upstream-downstream direction of the flow of air. The present aspect employs the delay adjustment unit configured to delay the output from the upstream sensor corresponding to one of the temperature sensor and the relative humidity sensor, whichever is placed upstream. The delay adjustment unit is further configured to reconcile change-behaviors of outputs from the temperature sensor and the relative humidity sensor in response to a state change in the air. The present aspect acquires the absolute humidity based on the sensor signal from the downstream sensor placed downstream and the sensor signal that is acquired from the upstream sensor and is delayed in the delay adjustment unit. Therefore, the aspect could enable to reconcile the change-behaviors of the outputs from the temperature sensor and the relative humidity sensor in response to a state change in the air. Thus, the aspect could enable to suppress an error in the absolute humidity in response to change in the air state.

According to an aspect of the present disclosure, an absolute humidity sensor comprises a temperature sensor placed in an environment allowing air to flow and configured to output a temperature signal as a sensor signal corresponding to temperature of air. The absolute humidity sensor further comprises a relative humidity sensor placed in the environment and configured to output a relative humidity signal as a sensor signal corresponding to relative humidity of air. The absolute humidity sensor further comprises an absolute humidity acquisition unit configured to acquire absolute humidity of air from the temperature signal and the relative humidity signal. The temperature sensor and the relative humidity sensor are placed at positions displaced in an upstream-downstream direction of a flow of air in the environment. The absolute humidity sensor further comprises an advance adjustment unit configured to advance an output from a downstream sensor corresponding to one of the temperature sensor and the relative humidity sensor placed downstream and to reconcile change-behaviors of an output from the temperature sensor and an output from the relative humidity sensor in response to a state change in air. The absolute humidity acquisition unit is configured to acquire the absolute humidity based on a sensor signal from an upstream sensor placed upstream and a sensor signal that is acquired from the downstream sensor and is advanced in the advance adjustment unit.

The present aspect acquires the absolute humidity in air from the temperature signal and the relative humidity signal output from the temperature sensor and the relative humidity sensor placed at positions displaced in the downstream-downstream direction of the flow of the air. The present aspect employs the advance adjustment unit configured to advance the output from the downstream sensor corresponding to one of the temperature sensor and the relative humidity sensor, whichever is placed downstream. The advance adjustment unit is further configured to reconcile the change-behaviors of the output from the temperature sensor and the output from the relative humidity sensor in response to a state change in the air. The present aspect acquires the absolute humidity based on the sensor signal from the upstream sensor placed upstream and the sensor signal that is acquired from the downstream sensor and is advanced in the advance adjustment unit. Therefore, the aspect could enable to reconcile the change-behaviors of the output from the temperature sensor and the output from the relative humidity sensor in response to the state change in the air. The present aspect also could enable to suppress an error in the absolute humidity in response to change in the air state.

The description below explains a plurality of embodiments of the present disclosure with reference to the accompanying drawings. In each embodiment, the same parts or components corresponding to the preceding embodiment are depicted by the same reference symbols and duplicate description may be omitted for simplicity. When only part of a configuration is described in each embodiment, the remaining part of the configuration can reference and apply the preceding embodiment already described. Similarly, step numbers can reference and apply the other preceding embodiments already described.

First Embodiment

The present embodiment uses an example of applying the present disclosure to an air flow meter 100. The airflow meter 100 includes an absolute humidity sensor. However, the present disclosure is not limited thereto. For example, the present disclosure may not be mounted on the airflow meter 100.

Figure 2:
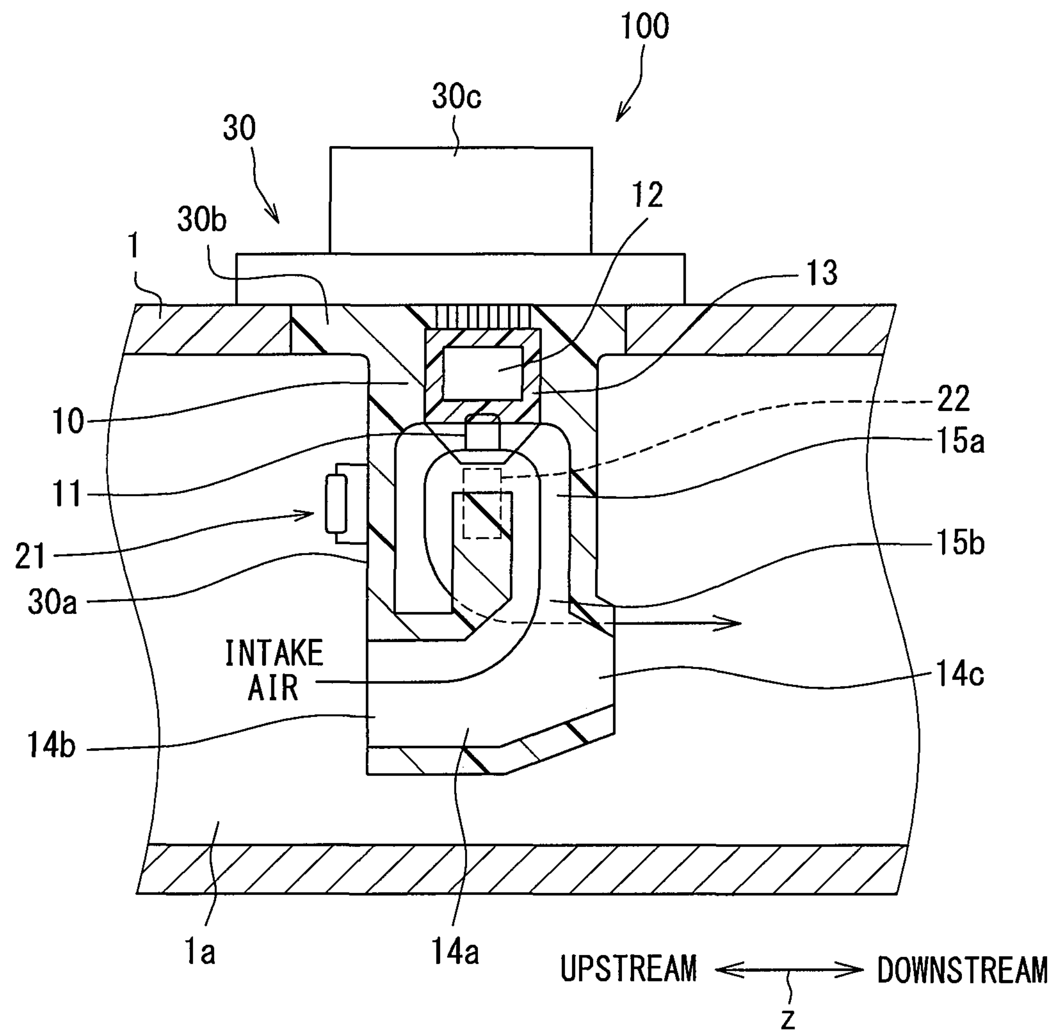
FIG. 2 is a cross-sectional view taken along the line II-II of FIG. 1.

The airflow meter 100 is mounted on a vehicle equipped with an internal combustion engine (hereinafter referred to as an engine) and has a thermal airflow volume measurement function that measures a flow volume of intake air taken into an engine cylinder. As illustrated in FIGS. 1 and 2, the airflow meter 100 outputs a sensor signal corresponding to the relative humidity and the temperature and in addition to the flow volume of intake air flowing in a duct 1 and acquires the absolute humidity based on the relative humidity and the temperature. The airflow meter 100 is capable of outputting the sensor signal and a signal (hereinafter referred to as an absolute humidity signal) representing the absolute humidity to an ECU 60 as an external apparatus.

The ECU 60 is provided separately from the airflow meter 100 and is electrically connected to the airflow meter 100. The present embodiment uses the ECU 60 as an example of the external apparatus. The ECU 60 is an abbreviation for an Electronic Control Unit and is provided with a microcomputer including a CPU, a memory including ROM and RAM, an input portion, an output portion, and a power supply circuit.

With reference to FIGS. 1 through 4, the description below explains the configuration of the airflow meter 100. The airflow meter 100 includes a flow volume sensor 10, a temperature sensor 21, a relative humidity sensor 22, a response delay processing unit 23*a*, an absolute humidity calculation unit 24, a housing 30, a pressure sensor 40, and a circuit chip 50.

As illustrated in FIGS. 1 and 2, the airflow meter 100 includes the housing 30 provided with the flow volume sensor 10, the temperature sensor 21, and the relative humidity sensor 22. The airflow meter 100 is detachably attached to the duct 1 such as an intake air tube (intake air duct) or an outlet duct of an air cleaner. The airflow meter 100 is inserted into a sensor insertion hole formed in a wall of the duct 1 so that the airflow meter 100 is partially placed in a main flow channel 1*a* in the duct 1.

While mounted on the duct 1, the airflow meter 100 allows the flow volume sensor 10, the temperature sensor 21, and the relative humidity sensor 20 to be placed at least partially in an environment where the intake air flows. For example, the flow volume sensor 10 allows at least the flow volume sensing portion 11 to be exposed to the intake air. The temperature sensor 21 and the relative humidity sensor 22 each allow at least the temperature sensing portion and the relative humidity sensing portion to be exposed to the intake air. According to the present embodiment, the environment allowing the air to flow signifies an environment allowing the intake air to flow in an engine.

As illustrated in FIGS. 1 and 2, the housing 30 is integrally provided with the flow volume sensor 10, the temperature sensor 21, and the relative humidity sensor 22. The housing 30 is also integrally provided with the pressure sensor 40 and the circuit chip 50 as well as these sensors.

As illustrated in FIGS. 1 and 2, for example, the housing 30 includes a bypass portion 30*a*, an engaging portion 30*b*, and a connector portion 30*c*.

The bypass portion 30*a* forms a bypass flow channel 14*a* and a sub-bypass flow channel 15*a* where the intake air flowing through the main flow channel 1*a* partially passes. The bypass flow channel 14*a* is provided between a bypass flow channel entry 14*b* and a bypass flow channel exit 14*c*. The intake air flowing through the bypass flow channel 14*a* partially flows into the sub-bypass flow channel 15*a* from a sub-bypass flow channel entry 15*b*. The sub-bypass flow channel 15*a* is provided between the sub-bypass flow channel entry 15*b* and a sub-bypass flow channel exit 15*c*.

The engaging portion 30*b* engages with the sensor insertion hole of the duct 1 via an O-ring. The connector portion 30*c* surrounds a terminal that makes electrical connection with the ECU 60. The airflow meter 100 can output a sensor signal and an absolute humidity signal to the ECU 60 via the connector portion 30*c*.

The housing 30 has been described concisely. The housing 30 can be embodied by referencing the housing described in JP 2016-109625 A, for example. The airflow meter 100 may be capable of communicating sensor signals with the ECU 60 while there has been described the example where the airflow meter 100 can electrically connect with the ECU 60. Therefore, the airflow meter 100 may be capable of wireless communication with the ECU 60.

Figure 10:
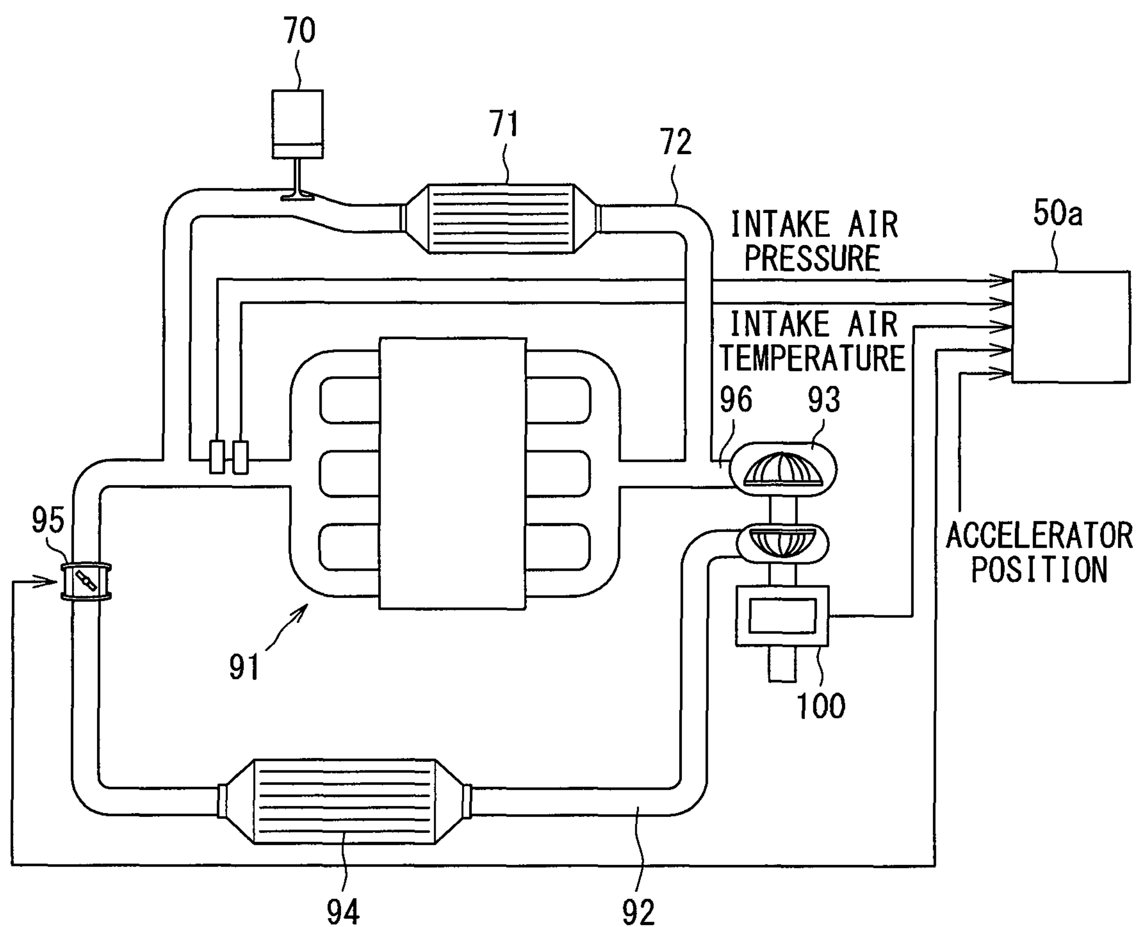
FIG. 10 is a diagram illustrating a schematic configuration of an EGR system mounted with the airflow meter according to the second embodiment.

As illustrated in FIG. 2, the flow volume sensor 10 outputs a sensor signal corresponding to the flow volume of the intake air flowing through the sub-bypass flow channel 15*a*. The sensor signal corresponding to the flow volume of the intake air may be referred to as a flow volume signal. As illustrated in FIG. 10, the flow volume sensor 10 includes the flow volume sensing portion 11, a flow volume process portion 12, and a flow volume sensor housing 13 that accommodates the flow volume sensing portion 11 and the flow volume process portion 12.

With the housing 30 attached to the duct 1, the flow volume sensing portion 11 is placed in the sub-bypass flow channel 15*a*. The flow volume process portion 12 is electrically connected to the flow volume sensing portion 11 and controls signals input to or output from the flow volume sensing portion 11. The flow volume process portion 12 is electrically connected to a terminal of a connector portion 30*d*. This enables the airflow meter 100 to output a flow volume signal to the ECU 60. The flow volume sensor 10 can be embodied by referencing the flow volume sensor described in JP 2015-90338 A, for example.

The temperature sensor 21 is placed in an environment allowing the intake air to flow and outputs a temperature signal as a sensor signal corresponding to the temperature of the intake air. Therefore, the temperature sensor 21 can detect the temperature of the intake air. As illustrated in FIG. 2, the temperature sensor 21 is attached outside the housing

30 and is placed in the main flow channel 1*a*. Unlike the flow volume sensor 10, the temperature sensor 21 detects the intake air flowing through the main flow channel 1*a*. Namely, the temperature sensor 21 outputs a sensor signal corresponding to the temperature of the intake air flowing through the main flow channel 1*a*.

The relative humidity sensor 22 includes a humidity sensitive film, for example. The relative humidity sensor 22 is placed in an environment allowing the intake air to flow and outputs a relative humidity signal as a sensor signal corresponding to the relative humidity of the intake air. Therefore, the relative humidity sensor 22 can detect the relative humidity of the intake air. As illustrated in FIG. 1, the relative humidity sensor 22 is attached outside the housing 30 and is placed in the main flow channel 1*a*. Unlike the flow volume sensor 10, the relative humidity sensor 22 detects the intake air flowing through the main flow channel 1*a*. Namely, the relative humidity sensor 22 outputs a sensor signal corresponding to the relative humidity of the intake air flowing through the main flow channel 1*a*.

The temperature sensor 21 and the relative humidity sensor 22 are separately configured and are both placed in the duct 1. As illustrated in FIG. 2, however, the temperature sensor 21 and the relative humidity sensor 22 are placed at different positions in an upstream-downstream direction of the intake air flow in the duct 1. In FIG. 2, the relative humidity sensor 22 is drawn in a broken line to clarify the positional relationship between the temperature sensor 21 and the relative humidity sensor 22. As above, being separately configured signifies that the temperature sensor 21 and the relative humidity sensor 22 are not provided for one substrate.

As above, the upstream-downstream direction of the intake air (or the air) flow signifies the positional relationship of the flow of the air until reaching each sensor from a given point but does not equal the upstream-downstream positional relationship of the mainstream flow. For example, the upstream-downstream direction of the intake air flow may signify the upstream-downstream positional relationship of an intake air flow in the main flow channel 1*a*, the upstream-downstream positional relationship of an intake air flow in the bypass portion 30*a*, or the upstream-downstream positional relationship of an intake air flow in the main flow channel 1*a* and the bypass portion 30*a*.

According to the present embodiment, the temperature sensor 21 is placed upstream of the relative humidity sensor 22. According to the present embodiment, therefore, the temperature sensor 21 corresponds to an upstream sensor and the relative humidity sensor 22 corresponds to a downstream sensor.

There is a difference in change-behaviors of output from the temperature sensor 21 and the relative humidity sensor 22 in response to a change in the air state because the temperature sensor 21 and the relative humidity sensor 22 are placed at different positions in the upstream-downstream direction of the intake air flow. The temperature sensor 21 and the relative humidity sensor 22 cannot assume the intake air in the same state to be a detection target when the intake air state changes. In other words, the temperature sensor 21 differs from the relative humidity sensor 22 in the responsiveness. The responsiveness here signifies the amount of delay in output.

The responsiveness depends on difference T between the timing to change the temperature or the humidity of the air having the specified temperature or humidity and the timing to output a temperature signal or a relative humidity signal from the temperature sensor 21 and the relative humidity sensor 22 while this timing varies similarly to the temperature or humidity of the air. When the temperature sensor 21 shows difference T larger than the relative humidity sensor 22, this signifies that the temperature sensor 21 is less responsive than the relative humidity sensor 22. When a sensor is placed at a position that decreases a flow rate in order to prevent the sensor from being contaminated, as an example of different responsivenesses depending on sensor positions, the sensor degrades the responsiveness, casing a response difference. A responsiveness adjustment means according to the present disclosure is effective also in this case.

The present disclosure is not limited thereto. The present disclosure just needs to place the temperature sensor 21 and the relative humidity sensor 22 at positions displaced in the upstream-downstream direction of the intake air flow. The temperature sensor 21 and the relative humidity sensor 22 may be placed at the bypass flow channel 14*a* or the sub-bypass flow channel 15*a*.

Figure 3:
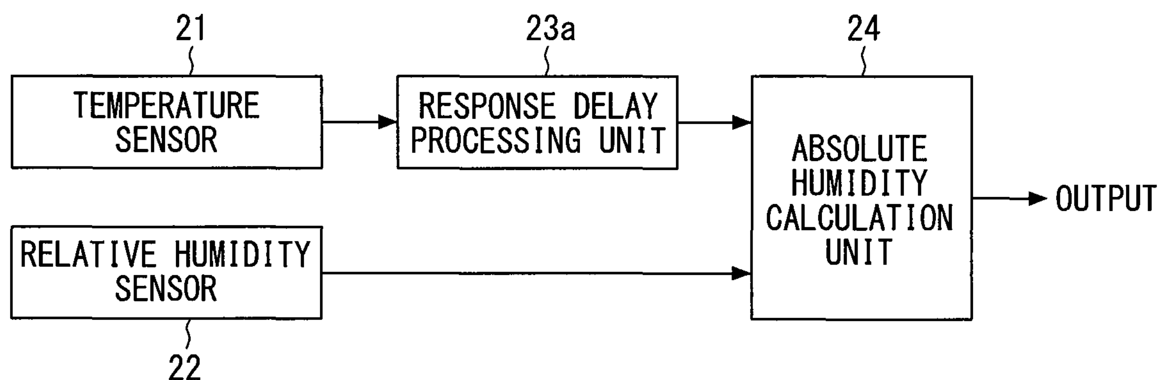
FIG. 3 is a block diagram illustrating a schematic configuration of the airflow meter according to the first embodiment.

The response delay processing unit 23*a* is comparable to a "delay adjustment unit" and is supplied with a sensor signal from the temperature sensor 21 as illustrated in FIG. 3. The response delay processing unit 23*a* delays output from the temperature sensor 21 as the upstream sensor and reconciles change-behaviors of output from the temperature sensor 21 and the relative humidity sensor 22 in response to a state change in the intake air. It is possible to predetermine a degree of delaying output for the response delay processing unit 23*a*. To do this, an experiment or a simulation is performed to confirm a difference between the temperature sensor 21 and the relative humidity sensor 22 in change-behaviors of output in response to a state change in the intake air. The response delay processing unit 23*a* may delay the output by using the software or an RC filter.

Even if placed upstream and downstream, the temperature sensor 21 and the relative humidity sensor 22 can assume the intake air in the same state to be a detection target when the intake air state changes. In other words, the response delay processing unit 23*a* can reconcile behaviors of output from the temperature sensor 21 and the relative humidity sensor 22 placed upstream and downstream. Alternatively, the response delay processing unit 23*a* can reconcile behaviors of output from the temperature sensor 21 and the relative humidity sensor 22 by delaying the timing of output from the temperature sensor 21 as the upstream sensor. Reconciling output behaviors of the two sensors may signify reconciling the responsivenesses of the two sensors.

The response delay processing unit 23*a* may be provided for the temperature sensor 21 or the circuit chip 50 to be described later. The response delay processing unit 23*a* may be provided between the temperature sensor 21 and the circuit chip 50. The airflow meter 100 just needs to have the function that delays output from the upstream sensor and reconciles change-behaviors of output from the temperature sensor 21 and the relative humidity sensor 22 in response to a state change in the intake air.

As illustrated in FIG. 3, the absolute humidity calculation unit 24 is supplied with a temperature signal from the temperature sensor 21 via the response delay processing unit 23*a* and is supplied with a humidity signal from the relative humidity sensor 22 without using the response delay processing unit 23*a*. The absolute humidity calculation unit 24 acquires the absolute humidity of the intake air from the temperature signal and the relative humidity signal. For example, the absolute humidity calculation unit 24 can acquire the absolute humidity of the intake air by performing operations according to predetermined arithmetic equations using the temperature signal and the relative humidity signal. The absolute humidity calculation unit 24 acquires the absolute humidity from a sensor signal from the relative humidity sensor 22 as the downstream sensor and a sensor signal from the temperature sensor 21 as the upstream sensor while this sensor signal is delayed in the response delay processing unit 23*a*.

In terms of the sensor signal from the relative humidity 22 as the downstream sensor, the object of the present disclosure is to reconcile change-behaviors of output from the temperature sensor and the humidity sensor in response to a state change in the air. In this case, the sensor signal from the relative humidity 22 as the downstream sensor may undergo at least one of a delaying process and an advancing process for some reason. Namely, the sensor signal from the relative humidity sensor 22 may not undergo the delaying process or the advancing process or may undergo the delaying process or the advancing process. Therefore, the sensor signal from the downstream sensor may not undergo the delaying process or the advancing process or may undergo the delaying process or the advancing process.

When a large amount of the advancing process is applied to a sensor signal from the downstream relative humidity 22, making the relative humidity sensor 22 more responsive than the upstream temperature sensor 21, a response adjustment unit of the upstream temperature sensor 21 may perform the advancing process. In this case, the amount of the advancing process for the upstream temperature sensor 21 is smaller than the amount of the advancing process for the downstream humidity sensor.

For example, the absolute humidity needed for engine control is a specific humidity equal to a mixing ratio and is found by using the equation of mixing ratio $r=mw/mg=A\times e/P-e$. Symbol mw denotes the mass of vapor contained in the air. Symbol mg denotes the mass of dry gas other than the vapor. Symbol A denotes a ratio between the molecular weight of vapor and the molecular weight of dry gas. Regarding the air, for example, the ratio is $18.016/28.966\approx0.622$. Symbol P denotes the total pressure of a gas. Symbol e denotes the steam pressure that is calculated as e=H (relative humidity)×es (saturated steam pressure).

However, the absolute humidity calculation unit 24 may acquire the absolute humidity from a temperature signal, a relative humidity signal, and an absolute humidity map. The absolute humidity map provides the association among a humidity signal, a temperature signal, and absolute humidity. Depending on engines, the absolute humidity needed for control may correspond to the absolute humidity representing the mass of the vapor contained in a unit volume.

The present embodiment uses the example where the absolute humidity calculation unit 24 is provided for the circuit chip 50. Namely, the circuit chip 50 includes the absolute humidity calculation unit 24 as a function block. The circuit chip 50 can be assumed to include a function to calculate the absolute humidity.

Figure 4:
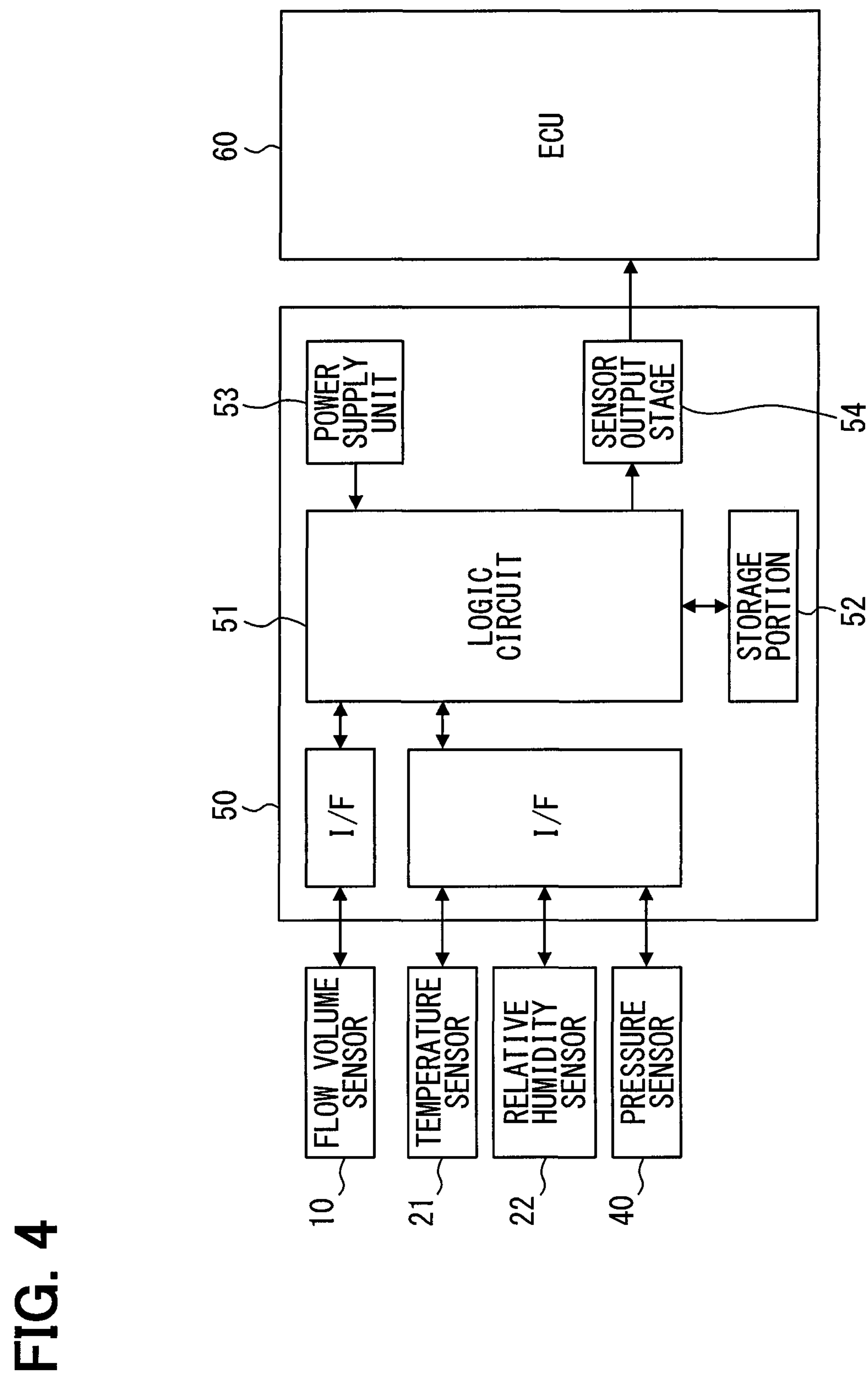
FIG. 4 is a block diagram illustrating a schematic configuration of a system including the airflow meter according to the first embodiment.

As illustrated in FIG. 4, the circuit chip 50 includes I/F to accept sensor signals from the sensors, a logic circuit 51, a storage portion 52, a power supply unit 53, and a sensor output stage 54. In the circuit chip 50, the logic circuit 51 operates on the power supplied from the power supply unit 53 and calculates the absolute humidity based on sensor signals from the sensors and the contents stored in the storage portion 52. The circuit chip 50 outputs the calculated absolute humidity to the ECU 60 via the sensor output stage 54. The sensor output stage 54 is available as SENT (Single Edge Nibble Transmission).

However, the present disclosure is not limited thereto. According to the present disclosure, the circuit chip 50 may output sensor signals supplied from the sensors to the ECU 60 via the sensor output stage 54 so that the ECU 60 acquires the absolute humidity. The ECU 60 may include an absolute humidity acquisition unit. In this case, the present disclosure may be assumed to include part of the ECU 60 (the absolute humidity calculation unit). The ECU 60 may also include the response delay processing unit.

The ECU 60 can acquire a flow volume signal output from the flow volume sensor 10 and the absolute humidity calculated in the absolute humidity calculation unit 24. The flow volume sensor 10 is assumed to have humidity characteristics that allow output to vary with the absolute humidity. In this case, the ECU 60 may include a correction portion that corrects a flow volume signal by using the absolute humidity. The ECU 60 corrects the flow volume signal to a small extent corresponding to the high absolute humidity and corrects the flow volume signal to a large extent corresponding to the low absolute humidity. The ECU 60 can improve the accuracy of a flow volume signal output from the flow volume sensor 10 regardless of the absolute humidity of the intake air. In this case, the present disclosure is assumed to include part of the ECU 60 (the correction portion).

The pressure sensor 40 outputs a pressure signal as a sensor signal corresponding to a pressure of the duct 1. Therefore, the pressure sensor 40 is assumed to detect the pressure of the duct 1. The present embodiment uses the example where the airflow meter 100 includes the pressure sensor 40. However, the present disclosure is not limited thereto. The airflow meter 100 may not include the pressure sensor 40.

The description below explains an effect of the airflow meter 100 by using an absolute humidity sensor as a comparative example. The absolute humidity sensor according to the comparative example differs from the airflow meter 100 in that the response delay processing unit 23*a* is not included.

Figure 6:
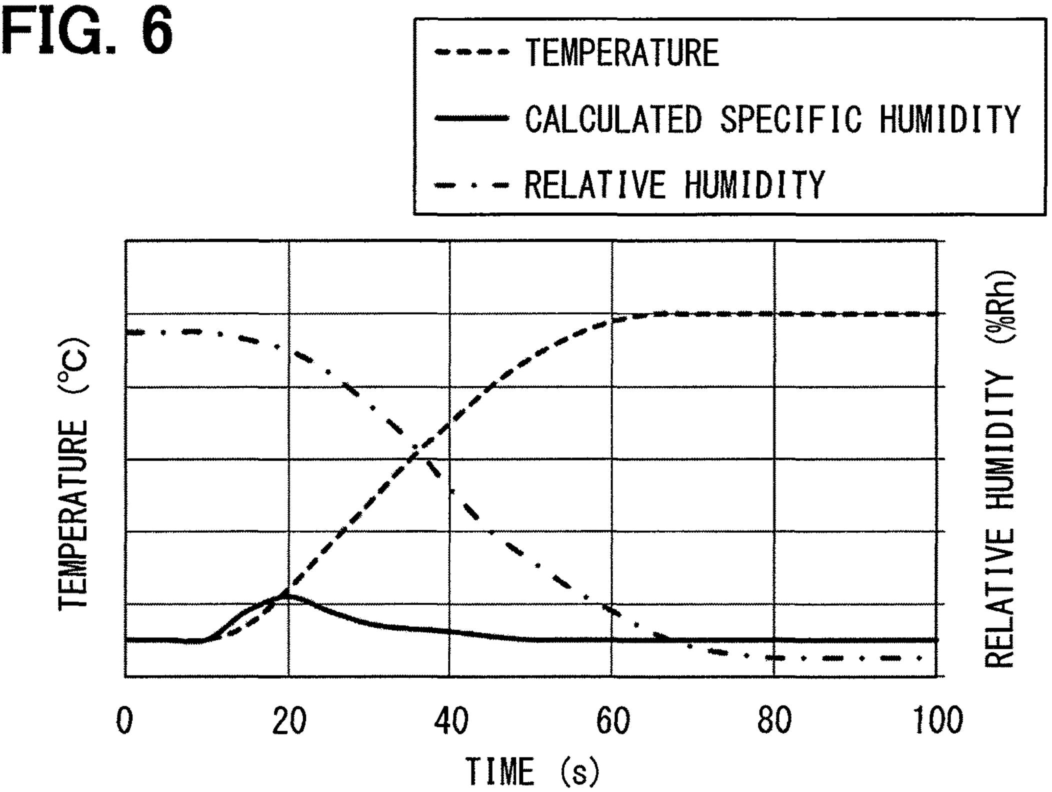
FIG. 6 is a graph illustrating output characteristics of an airflow meter according to a comparative example.

Similarly to the airflow meter 100, the absolute humidity sensor according to the comparative example acquires the absolute humidity in the air from a temperature signal and a relative humidity signal output from the temperature sensor 21 and the relative humidity sensor placed at positions displaced in the upstream-downstream direction of the intake air flow. As illustrated in FIG. 6, therefore, the absolute humidity sensor according to the comparative example is subject to a difference in change-behaviors of output from the temperature sensor 21 and the relative humidity sensor 22 in response to a state change in the intake air. Around 10 to 30 seconds in FIG. 6, a spike-like error occurs in the absolute humidity calculated by the absolute humidity sensor according to the comparative example.

Normally, an increase in the intake air temperature causes a value representing the amount of saturated vapor calculated from the temperature sensor 21 to be larger than a value representing the amount of saturated vapor sensed by the relative humidity sensor 22. This increases the absolute humidity calculated by using the amount of saturated vapor calculated from a sensor signal of the temperature sensor 21. This state occurs when the intake air temperature changes, causing a spike-like error.

Figure 5:
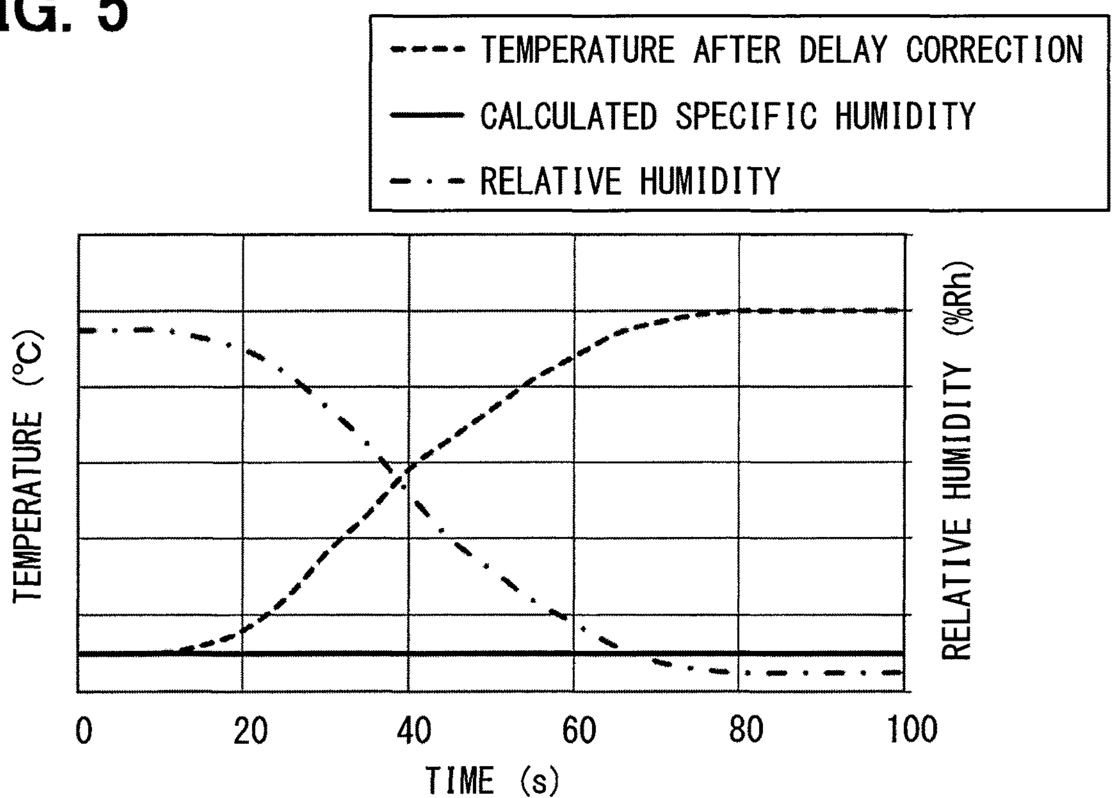
FIG. 5 is a graph illustrating output characteristics of the airflow meter according to the first embodiment.

The airflow meter 100 includes the response delay processing unit 23*a* that delays output from the temperature sensor 21 as the upstream sensor and reconciles change-behaviors of output from the temperature sensor 21 and the relative humidity sensor 22 in response to a state change in the intake air. The airflow meter 100 acquires the absolute humidity from a sensor signal from the relative humidity sensor 22 as the downstream sensor and a sensor signal that is generated from the temperature sensor 21 as the upstream sensor and is delayed in the response delay processing unit 23*a*. As illustrated in FIG. 5, the airflow meter 100 can, therefore, reconcile change-behaviors of output from the temperature sensor 21 and the relative humidity sensor 22 in response to a state change in the air. As illustrated in FIG. 5, the airflow meter 100 can suppress an error in the absolute humidity when the intake air state changes. In other words, the airflow meter 100 can improve the accuracy of the absolute humidity in a transient state.

The airflow meter 100 can apply the same time (value) to difference T described above and the quantity of delaying an output from the upstream sensor. To determine whether the same value is assumed, a simulation is performed to determine whether a spike-like error occurs in the absolute humidity. The same value is assumed when no spike-like waveform (error) occurs. The same value is not assumed when a spike-like error occurs. When the maximum value of the spike-like waveform is smaller than a specified value, the same value is not assumed but approximately the same value or an allowable value is taken. A response adjustment value (advance amount or delay amount) is specified so that the spike-like error is smaller than or equal to a predetermined value in consideration of response variations in the sensors.

Figure 7:
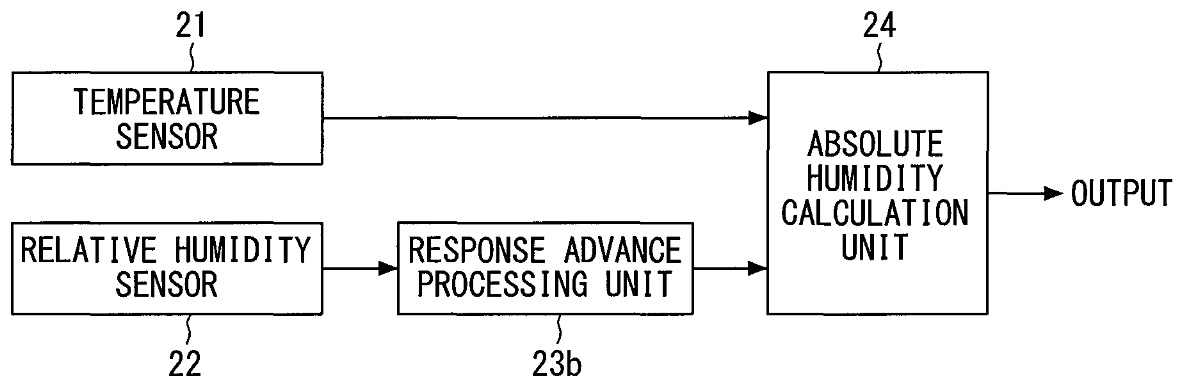
FIG. 7 is a block diagram illustrating a schematic configuration of an airflow meter according to a first modification.

With reference to FIG. 7, the description below explains a first modification as a modification of the first embodiment. As illustrated in FIG. 7, the airflow meter 100 according to the first modification includes a response advance processing unit 23*b* instead of the response delay processing unit 23*a*. Otherwise, the first modification is similar to the above-described embodiment.

The response advance processing unit 23*b* is comparable to an "advance adjustment unit" and is supplied with a sensor signal from the relative humidity sensor 22 as illustrated in FIG. 7. The response advance processing unit 23*b* advances output from the relative humidity sensor 22 as the downstream sensor and reconciles change-behaviors of output from the temperature sensor 21 and the relative humidity sensor 22 in response to a state change in the intake air. The response advance processing unit 23*b* can advance an output based on the software, for example.

When the intake air state changes, it is possible to ensure the state of using the same-state intake air as a detection target even if the temperature sensor 21 and the relative humidity sensor 22 are placed upstream and downstream. In other words, the response advance processing unit 23*b* can reconcile behaviors of output from the temperature sensor 21 and the relative humidity sensor 22 that are placed upstream and downstream.

The response advance processing unit 23*b* may be provided for the relative humidity sensor 22 or the circuit chip 50. The response advance processing unit 23*b* may be provided between the temperature sensor 21 and the circuit chip 50. The airflow meter 100 just needs to have the function that advances output from a downstream sensor and reconciles change-behaviors of output from the temperature sensor 21 and the relative humidity sensor 22 in response to a state change in the intake air.

As illustrated in FIG. 7, the absolute humidity calculation unit 24 is supplied with a humidity signal from the relative humidity sensor 22 via the response advance processing unit 23*b* and is supplied with a temperature signal from the temperature sensor 21 without using the response advance processing unit 23*b*. Similarly to the above-described embodiment, the absolute humidity calculation unit 24 acquires the absolute humidity of the intake air from the temperature signal and the relative humidity signal. The airflow meter 100 according to the first modification can provide the effect similar to the above-described embodiment.

The purpose here is to reconcile change-behaviors of output from the temperature sensor 21 and the relative humidity sensor 22 in response to a state change in the air. Therefore, the sensor signal from the temperature sensor 21 as the upstream sensor may undergo at least one of the delaying process and an advancing process for some reason. Namely, the sensor signal from the temperature sensor 21 may not undergo the delaying process or the advancing process or may undergo the delaying process or the advancing process. Therefore, the sensor signal from the upstream sensor may not undergo the delaying process or the advancing process or may undergo the delaying process or the advancing process.

When the upstream temperature sensor 21 undergoes a large amount of sensor signal delaying process and is less responsive than the downstream relative humidity sensor 22, the response adjustment unit of the relative humidity sensor 22 may perform the delaying process. In this case, the delaying process quantity for the downstream relative humidity sensor 22 is smaller than the delaying process quantity for the upstream temperature sensor 21.

The airflow meter 100 can apply the same time (value) to difference T described above and the quantity of advancing an output from the downstream sensor. As above, to determine whether the same value is assumed, a simulation is performed to determine whether a spike-like error occurs in the absolute humidity. As above, it is also possible to determine whether a spike-like waveform occurs and to determine whether the same value is assumed. As above, a response adjustment value (advance amount or delay amount) is specified so that the spike-like error is smaller than or equal to a predetermined value in consideration of response variations in the sensors.

Figure 8:
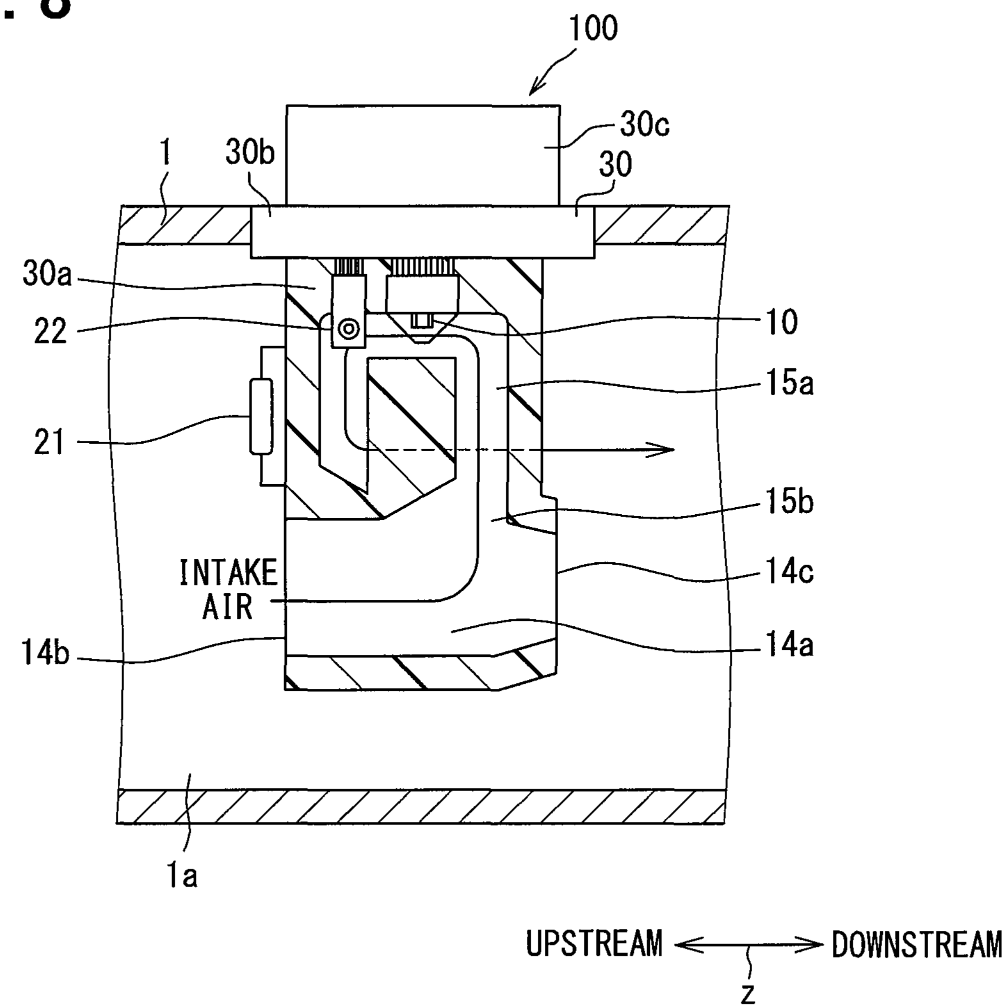
FIG. 8 is a cross-sectional view illustrating an airflow meter according to a second modification.

With reference to FIG. 8, the description below explains a second modification as a modification of the first embodiment. As illustrated in FIG. 8, the airflow meter 100 according to the second modification includes the relative humidity sensor 22 provided for the sub-bypass flow channel 15*a*. Otherwise, the second modification is similar to the above-described embodiment.

The airflow meter 100 according to the second modification includes the relative humidity sensor 22 provided for the sub-bypass flow channel 15*a*. Therefore, the temperature sensor 21 and the relative humidity sensor 22 are placed upstream and downstream. The airflow meter 100 according to the second modification allows a distance between the temperature sensor 21 and the relative humidity sensor 22 on the flow channel for the intake air to be longer than the above-described embodiment. If used for the second modification, the response delay processing unit 23*a* delays output later than the above-described embodiment. If used for the second modification, the response advance processing unit 23*b* advances output earlier than the above-described embodiment.

The airflow meter 100 according to the second modification can provide the effect similar to the above-described embodiment. The present disclosure may place the relative humidity sensor 22 at the position of the temperature sensor 21 and place the temperature sensor 21 at the position of the relative humidity sensor 22. As above, the upstream-downstream direction of the intake air (or the air) flow signifies the positional relationship of the flow of the air until reaching each sensor from a given point but does not equal the upstream-downstream positional relationship of the mainstream flow. For example, the upstream-downstream direction of the intake air flow may signify the upstream-downstream positional relationship of an intake air flow in the main flow channel 1*a*, the upstream-downstream positional relationship of an intake air flow in the bypass portion 30*a*, or the upstream-downstream positional relationship of an intake air flow in the main flow channel 1*a* and the bypass portion 30*a*.

The plural embodiments have been described. However, the present disclosure is not limited to the above-described embodiments and can be variously modified without departing from the spirit and scope of the disclosure. The description below explains second through fourth embodiments and modifications as other embodiments. The above-described embodiment and the other embodiments and modifications are available not only independently but also in an appropriate combination. The present disclosure is not limited to the combinations described in the embodiments but is available as various combinations.

Second Embodiment

Figure 9:
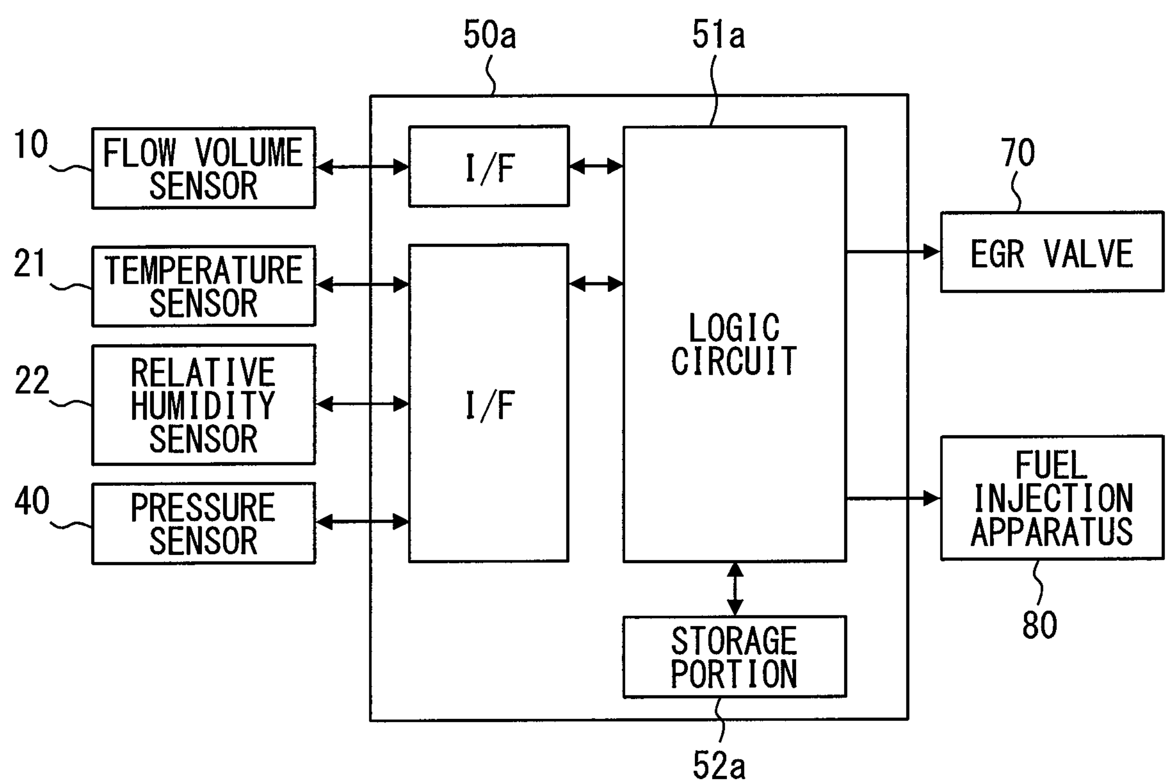
FIG. 9 is a block diagram illustrating a schematic configuration of a system including an airflow meter according to a second embodiment.

With reference to FIGS. 9 and 10, the description below explains the second embodiment.

As illustrated in FIGS. 9 and 10, the airflow meter 100 according to the second embodiment is applied to an EGR system. For example, the ECU 50*a* includes an I/F, a logic circuit 51*a*, and a storage portion 52*a* and electrically connects with an EGR valve 70 and a fuel injection apparatus 80. The ECU 50*a* is supplied with signals representing an intake air pressure, an intake air temperature, and an accelerator position.

As illustrated in FIG. 10, the EGR system is a well-known technology including the EGR valve 70, an EGR cooler 71, an EGR path 72, an engine 91, an intake air path 92, a turbocharger 93, an intercooler 94, a throttle valve 5, and an exhaust path 96.

The EGR system can reduce the amount of heat generation by mixing the intake air with combustion gas and decreasing the oxygen concentration of the air supplied to a combustion chamber. The intake air quantity is unchanged and the combustion temperature decreases, making it possible to suppress the generation of NOx. However, a decrease in the combustion temperature hinders re-combustion of the soot and accordingly increases an exhaust force of the soot. There is a trade-off between NOx and the soot, requiring an optimal EGR control.

The EGR valve mainly controls the mixed quantity of combustion gas. In the EGR system, the airflow meter 100 measures the fresh air quantity, calculates the intake air mass of the engine based on engine states (such as speed and pressure), and calculates an EGR ratio (combustion gas divided by intake air mass). However, a system without the airflow meter approximates an EGR ratio based on an engine state and an EGR valve position. Therefore, the fresh air quantity needs to be highly accurately measured in order to highly accurately control the EGR ratio. The EGR system enables a gasoline engine to open a throttle to a greater extent under the condition of any requested output, making it possible to reduce a pumping loss.

An engine burns a sulfur content in the fuel to generate $SO_2$ (sulfur dioxide). The $SO_2$ melts into moisture in the exhaust gas to generate sulfuric acid. As an issue of the EGR system, the sulfuric acid corrodes a cylinder wall, a piston ring, or an injector nozzle. Due to this issue, the EGR system needs to suppress an EGR gas flow volume within a range smaller than an EGR gas flow volume requested to reduce NOx or improve the fuel economy, namely, within a range capable of suppressing the corrosion.

The EGR system can find the amount of moisture in the exhaust gas by measuring the absolute humidity, making it possible to increase an EGR suppression limit. The ECU 50*a* adjusts the EGR gas flow volume in accordance with a change in the absolute humidity of the intake air. The airflow meter 100 outputs the absolute humidity acquired from the absolute humidity calculation unit 24 to the ECU 50*a*.

As above, the airflow meter 100 can highly accurately acquire the absolute humidity of the intake air. The airflow meter 100 outputs the absolute humidity to the ECU 50*a*, enabling the ECU 50*a* to highly accurately control the EGR. Therefore, the airflow meter 100 can reduce fuel consumption, the amount of exhaust gas, and the water condensation in the exhaust gas. The airflow meter 100 can reduce the water condensation in the exhaust gas and therefore can also reduce damage to the injector.

Figure 11:
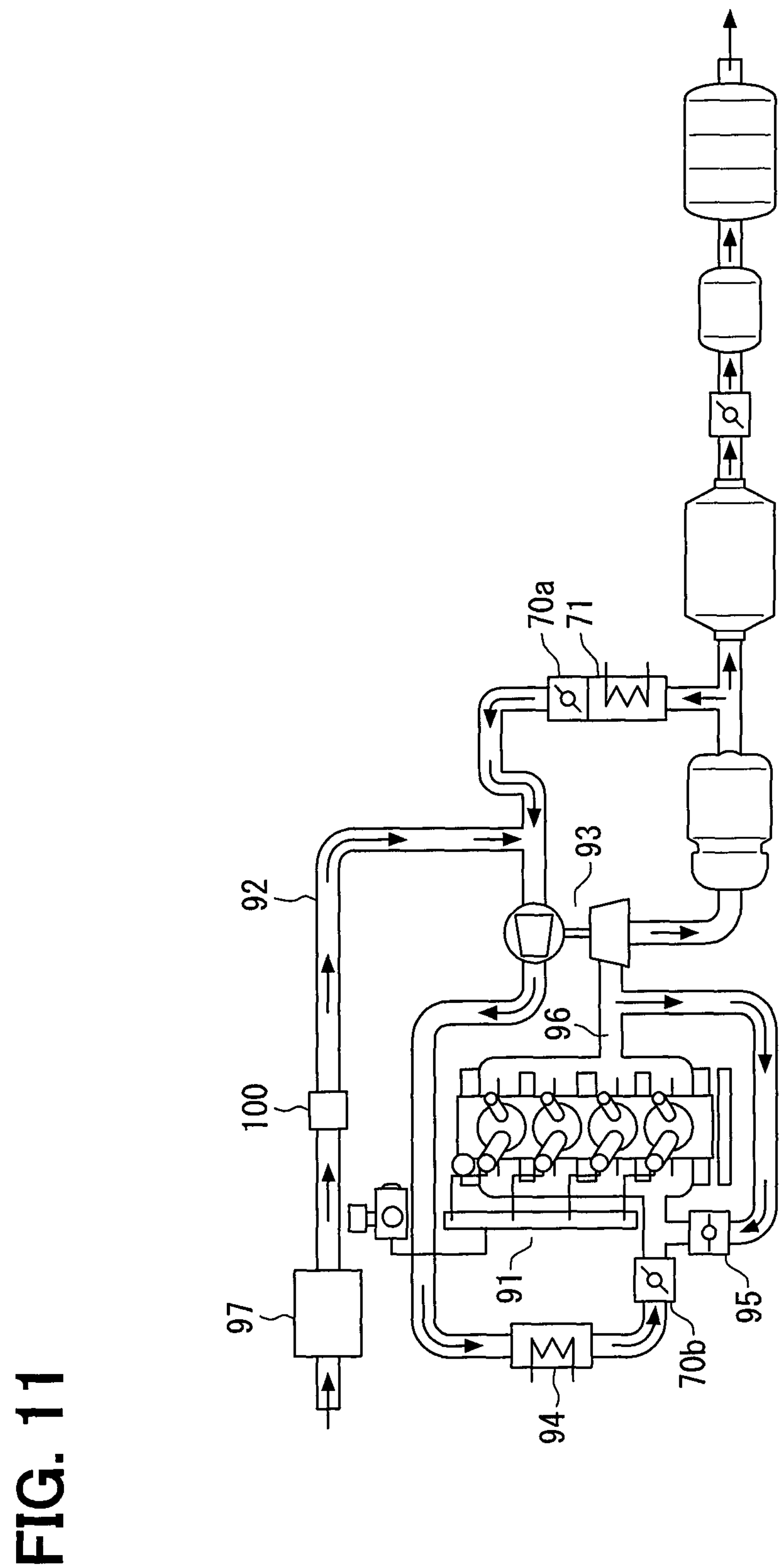
FIG. 11 is a diagram illustrating a schematic configuration of an EGR system mounted with an airflow meter according to a third modification.

With reference to FIG. 11, the description below explains a third modification as a modification of the second embodiment. The airflow meter 100 according to the third modification can be applied to an EGR system as illustrated in FIG. 11. The EGR system according to the third modification differs from the above-described EGR system in that a low-pressure EGR valve 70*a*, a high-pressure EGR valve 70*b*, and an air filter 97 are included. This EGR system includes a low-pressure EGR and a high-pressure EGR according to a well-known technology. The airflow meter 100 according to the third modification can provide the effect similar to the second embodiment.

Third Embodiment

Figure 12:
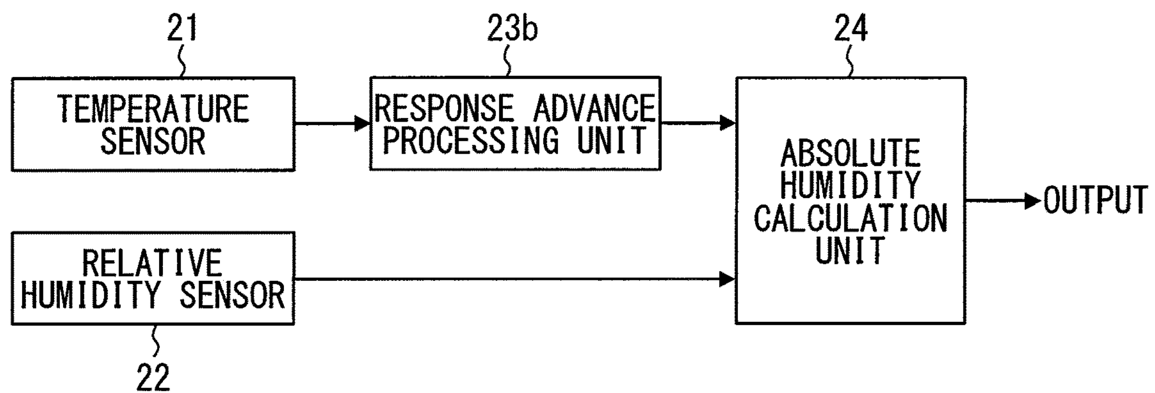
FIG. 12 is a block diagram illustrating a schematic configuration of an airflow meter according to a third embodiment.

With reference to FIG. 12, the description below explains the third embodiment.

In the airflow meter 100 according to the third embodiment, the relative humidity sensor 22 is placed upstream of the temperature sensor 21. According to the present embodiment, therefore, the relative humidity sensor 22 corresponds to an upstream sensor and the temperature sensor 21 corresponds to a downstream sensor.

As illustrated in FIG. 12, the airflow meter 100 according to the third embodiment includes the response advance processing unit 23*b* placed between the temperature sensor 21 and the absolute humidity calculation unit 24. The airflow meter 100 according to the third embodiment does not include the response advance processing unit 23*b* between the relative humidity sensor 22 and the absolute humidity calculation unit 24. The airflow meter 100 according to the third embodiment can provide the effect similar to the first embodiment.

Figure 13:
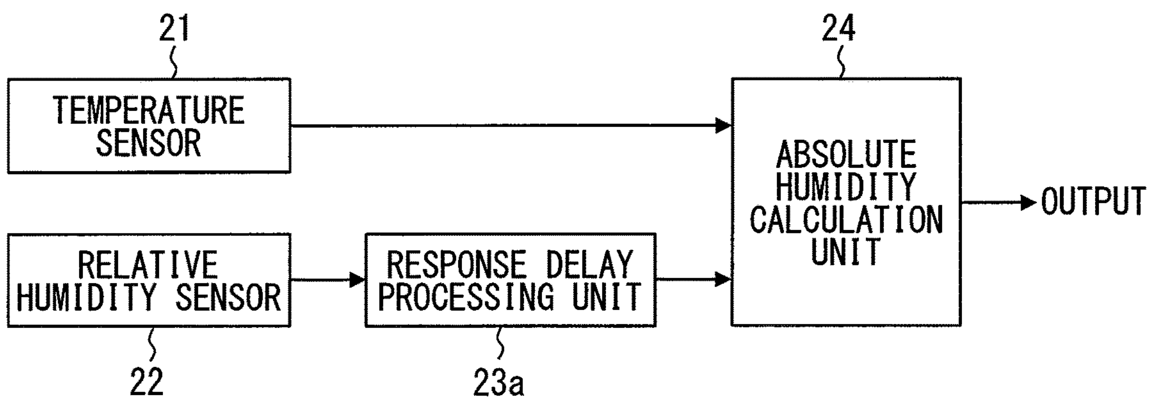
FIG. 13 is a block diagram illustrating a schematic configuration of an airflow meter according to a fourth modification.

With reference to FIG. 13, the description below explains a fourth modification as a modification of the third embodiment.

In the airflow meter 100 according to the fourth modification, the relative humidity sensor 22 is placed upstream of the temperature sensor 21. According to the present embodiment, therefore, the relative humidity sensor 22 corresponds to an upstream sensor and the temperature sensor 21 corresponds to a downstream sensor.

As illustrated in FIG. 13, the airflow meter 100 according to the fourth modification includes the response delay processing unit 23*a* placed between the relative humidity sensor 22 and the absolute humidity calculation unit 24. The airflow meter 100 according to the fourth modification does not include the response delay processing unit 23*a* between the temperature sensor 21 and the absolute humidity calculation unit 24. The airflow meter 100 according to the fourth modification can provide the effect similar to the third embodiment.

Fourth Embodiment

Figure 14:
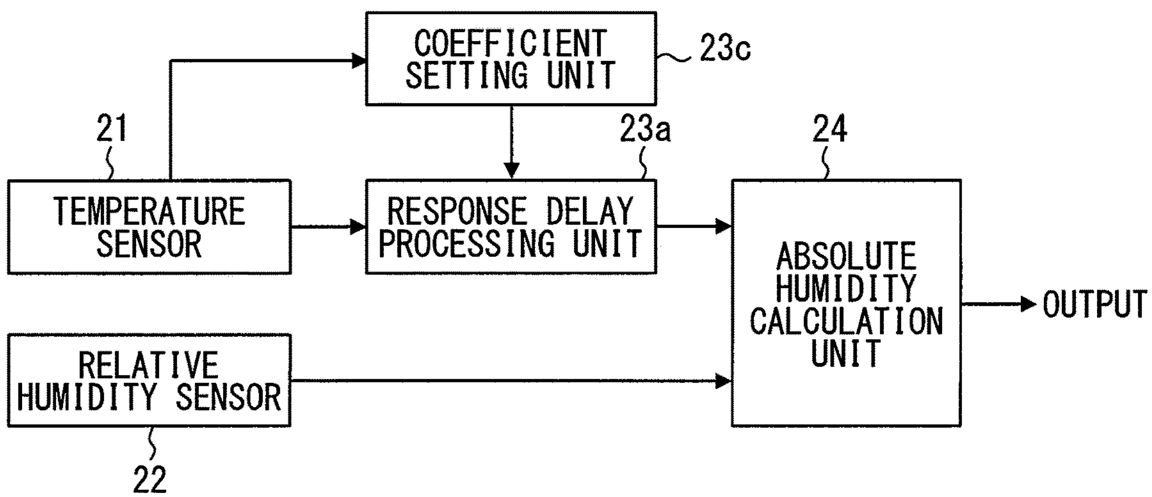
FIG. 14 is a block diagram illustrating a schematic configuration of an airflow meter according to a fourth embodiment.

With reference to FIGS. 14 and 15, the description below explains the fourth embodiment.

Similarly to the first embodiment, the airflow meter 100 according to the fourth embodiment includes the temperature sensor 21 placed upstream of the relative humidity sensor 22 and includes the response delay processing unit 23*a*. The fourth embodiment differs from the first embodiment in that the airflow meter 100 according to the fourth embodiment includes a coefficient setting unit 23*c* that provides a delay coefficient for the response delay processing unit 23*a* to delay output based on a temperature signal output from the temperature sensor 21.

As illustrated in FIG. 15, the relative humidity sensor 22 varies the responsiveness to detect the relative humidity depending on the intake air temperature. When the intake air temperature is high rather than low, the humidity in the humidity sensitive film diffuses rapidly and the relative humidity sensor 22 increases the responsiveness.

As illustrated in FIG. 14, the coefficient setting unit 23*c* provides a delay coefficient that delays output from the temperature sensor 21 to a greater extent when the intake air temperature is low rather than high based on the temperature signal. Therefore, the response delay processing unit 23*a* delays output from the temperature sensor 21 when the intake air temperature is low rather than high. In other words, the response delay processing unit 23*a* decreases the extent to delay output from the temperature sensor 21 when the intake air temperature is high rather than low. The coefficient setting unit 23*c* provides a delay coefficient appropriate for the acquired temperature signal by referencing a map associating the temperature signal and the delay coefficient, for example.

The airflow meter 100 according to the fourth modification can provide the effect similar to the first embodiment. The airflow meter 100 according to the fourth embodiment can reconcile change-behaviors of output from the temperature sensor 21 and the relative humidity sensor 22 more accurately than a case where no delay coefficient is used. Therefore, the airflow meter 100 can acquire the absolute humidity more accurately than a case where no delay coefficient is used.

As illustrated in FIG. 15, the relative humidity sensor varies the responsiveness to detect the relative humidity depending on not only the intake air temperature but also the flow rate of the intake air. The temperature sensor varies the responsiveness to detect the temperature depending on the flow rate of the intake air. The intake air at a high flow rate rapidly ventilates the air of atmosphere where the humidity sensor is placed. In this case, the relative humidity sensor 22 increases the responsiveness. The intake air at a high flow rate causes the temperature sensor 21 to be highly responsive because the temperature sensor 21 reacts to the temperature based on the airflow. In FIG. 15, HIGH signifies a high flow rate and LOW signifies a low flow rate.

The coefficient setting unit 23*c* is capable of acquiring a flow rate signal representing the flow rate of the intake air. The coefficient setting unit 23*c* provides a delay coefficient that delays output from the temperature sensor 21 when an intake air rate is low rather than high. Therefore, the response delay processing unit 23*a* decreases the extent of delaying output from the temperature sensor 21 when the flow rate of the intake air is high rather than low. The airflow meter 100 can thereby highly accurately acquire the absolute humidity similarly to the case of providing a delay coefficient based on the temperature.

FIG. 15 provides an example and may depend on sensor configurations, sensor structures, or sensor materials. It is favorable to settle coefficients by performing simulations or producing prototypes and confirming tendencies. To settle coefficients, it may be helpful to use the information about such factors varying the responsiveness as a flow volume, a pressure or air pulsation other than the temperature. It may also be helpful to use the information estimated from various sensors.

The airflow meter 100 according to the fourth embodiment can increase the responsiveness of calculating the absolute temperature more highly than the first embodiment. The airflow meter 100 according to the fourth embodiment can decrease a time lag before the absolute temperature is calculated, increasing the accuracy of calculating the absolute temperature. The sensors cannot completely respond, causing not a little response delay. The airflow meter 100 according to the fourth embodiment includes the advancing process and therefore produces an effect of providing the absolute humidity that causes a little response delay and approximates to the response of the actual absolute humidity.

The coefficient setting unit 23*c* may provide an advance coefficient used for the response advance processing unit 23*b* to advance an output. In this case, the coefficient setting unit 23*c* provides an advance coefficient contrary to the value used to set a delay coefficient. The airflow meter 100 can thereby highly accurately acquire the absolute humidity similarly to the case of providing a delay coefficient based on the temperature.

The present disclosure has been described with reference to the embodiments but is not limited to the embodiments and structures. The present disclosure covers various modification examples and modifications within a commensurate scope. In addition, the category or the scope of the idea of the present disclosure covers various combinations or forms and moreover the other combinations or forms including only one element or more or less in the former.

The invention claimed is:

1. An absolute humidity sensor comprising:

a temperature sensor placed in an environment allowing air to flow and configured to output a temperature signal as a sensor signal corresponding to temperature of air;

a relative humidity sensor placed in the environment and configured to output a relative humidity signal as a sensor signal corresponding to relative humidity of air; and an absolute humidity acquisition unit configured to acquire absolute humidity of air from the temperature signal and the relative humidity signal, wherein the temperature sensor and the relative humidity sensor are placed at positions displaced in an upstream-downstream direction of a flow of air in the environment, the absolute humidity sensor further comprising:

a delay adjustment unit configured to delay an output from an upstream sensor corresponding to one of the temperature sensor and the relative humidity sensor placed upstream and to reconcile change-behaviors of an output from the temperature sensor and an output from the relative humidity sensor in response to a state change in air, wherein the absolute humidity acquisition unit is configured to acquire the absolute humidity based on a sensor signal from a downstream sensor placed downstream and a sensor signal that is acquired from the upstream sensor and is delayed in the delay adjustment unit.

2. The absolute humidity sensor according to claim 1, further comprising:

a coefficient setting unit configured to acquire a flow rate signal representing a flow rate of air and to provide a delay coefficient for the delay adjustment unit to delay the output from the upstream sensor based on at least one of the flow rate signal and the temperature signal.

3. An absolute humidity sensor comprising:

a temperature sensor placed in an environment allowing air to flow and configured to output a temperature signal as a sensor signal corresponding to temperature of air;

a relative humidity sensor placed in the environment and configured to output a relative humidity signal as a sensor signal corresponding to relative humidity of air; and an absolute humidity acquisition unit configured to acquire absolute humidity of air from the temperature signal and the relative humidity signal, wherein the temperature sensor and the relative humidity sensor are placed at positions displaced in an upstream-downstream direction of a flow of air in the environment, the absolute humidity sensor further comprising:

an advance adjustment unit configured to advance an output from a downstream sensor corresponding to one of the temperature sensor and the relative humidity sensor placed downstream and to reconcile change-behaviors of an output from the temperature sensor and an output from the relative humidity sensor in response to a state change in air, wherein the absolute humidity acquisition unit is configured to acquire the absolute humidity based on a sensor signal from an upstream sensor placed upstream and a sensor signal that is acquired from the downstream sensor and is advanced in the advance adjustment unit.

4. The absolute humidity sensor according to claim 3, further comprising:

a coefficient setting unit configured to acquire a flow rate signal representing a flow rate of air and to provide an advance coefficient for the advance adjustment unit to advance output from the downstream sensor based on at least one of the flow rate signal and the temperature signal.

5. The absolute humidity sensor according to claim 1, comprising:

a flow volume sensor configured to output a flow volume signal as a sensor signal corresponding to a flow volume of air; and a correction portion configured to correct the flow volume signal by using the absolute humidity acquired from the absolute humidity acquisition unit.

6. The absolute humidity sensor according to claim 1, wherein the temperature sensor and the relative humidity sensor are placed in an environment that allows intake air to flow into an internal combustion engine and that is the environment allowing air to flow, and the absolute humidity acquired from the absolute humidity acquisition unit is output to a control apparatus configured to adjust an EGR gas flow volume corresponding to a change in the absolute humidity of the intake air.

7. An absolute humidity sensor comprising:

a temperature sensor placed in an environment allowing air to flow and configured to output a temperature signal as a sensor signal corresponding to temperature of air; and a relative humidity sensor placed in the environment and configured to output a relative humidity signal as a sensor signal corresponding to relative humidity of air, wherein the temperature sensor and the relative humidity sensor are placed at positions displaced in an upstream-downstream direction of a flow of air in the environment, one of the temperature sensor and the relative humidity sensor placed downstream is a downstream sensor, and an other of the temperature sensor and the relative humidity sensor placed upstream is an upstream sensor, the absolute humidity sensor further comprising:

a processor configured to execute instructions to perform:

reconciling change-behaviors of the sensor signal from the temperature sensor and the sensor signal from the relative humidity sensor in response to a state change in air by advancing the sensor signal from the downstream sensor or by delaying the sensor signal from the upstream sensor; and acquiring an absolute humidity of air based on the reconciled sensor signals.

* * * * *